Patented Jan. 14, 1941

2,228,483

UNITED STATES PATENT OFFICE 2,228,483

PROCESS FOR THE PREPARATION OF PRODUCTS DELIVERING CARBONIC ACID GAS

Bernhard Raecke, Dusseldorf-Schlageterstadt, Germany, assignor to Henkel & Cie., G. m. b. H., Dusseldorf-Holthausen, Germany, a corporation of Germany No Drawing. Application May 15, 1939, Serial No. 273,692. In Germany May 18, 1938

5 Claims. (Cl. 23—6)

This invention relates to compositions of matter suitable for delivering gases upon the addition of water. More particularly the invention relates to preparations in various solid forms which, upon addition to water baths, react to form carbonic acid gas and to produce bubbles.

The addition of compositions to water baths which liberate gas, for instance, carbonic acid gas, thereby producing bubbles in the water is a desirable practice well known in the arts. Such compositions are used for cosmetic and therapeutic purposes because the bubbling action in the baths has an intensive effect upon the skin. These bubbling baths have been produced by the liberation of carbonic acid gas often derived by adding carbonates, such as sodium carbonate, particularly sodium bicarbonate, to water baths and simultaneously or later adding acids or acid salts which react and liberate the carbonic acid gas from the carbonates present. Many organic and inorganic acids and acid salts have either been used or suggested for use in combination with the carbonates for accomplishing this result. Included among these acids and salts are such inorganic acids as hydrochloric acid and boric acid; such acid salts as sodium bisulfate and sodium bisulfite; such organic acids as citric acid, tartaric acid, formic acid, methyl adipinic acid and the like. These products designed to produce bubbling effects in water baths have been marketed either in separate packages, in mixtures, or in various forms, such as in the form of powders, tablets, and the like.

Considerable difficulty has been experienced, however, in the preparation of solid mixtures of the carbonates with the acids or acid salts. Such mixtures have proven to be hygroscopic and, therefore, unstable during storage thereby bringing about a premature decomposition of the carbonates with a resulting loss of the carbonic acid gas. To prevent this loss of carbonic acid during storage, it has been the practice in some instances to add the carbonates and the acids to the baths separately immediately before use. The addition of protective ingredients to the mixtures to regulate the development of the gas has been suggested. All of these attempts at solving the problem, however, have proven to be inconvenient or costly and, therefore, have not met with very general acceptance. No commercially feasible method is known for providing stable compositions in a solid form which are satisfactory for producing carbonic acid gas upon their addition to treatment baths containing water.

It is an object of this invention to produce a composition stable against deterioration in storage and in a solid form which produces carbonic acid gas upon adding to water or water baths. Another object is to produce a convenient and inexpensive non-hygroscopic solid effervescent composition which retains its effectiveness in storage.

In accordance with the present invention, stable and inexpensive compositions capable of developing carbonic acid gas have been produced in solid form by adding sulfaminic acid having the general formula $NH_2SO_3H$, to the various carbonates heretofore found suitable for producing such gas. Sulfaminic acid is inexpensive and readily obtainable in a solid form. Furthermore, it forms a non-hygroscopic composition in combination with the customary carbonates used for producing carbonic acid gases. The sulfaminic acid also has the added advantage of forming water-soluble salts with the ordinary alkaline agents found in water and of being compatible with conventional therapeutic and cosmetic addition agents. Compositions composed of mixtures of sulfaminic acid, carbonates, and ordinary addition agents may be easily prepared in a dried, solid form and marketed in the form of powders; or they may be pressed by known methods into tablets, balls, cakes and the like and marketed in that form.

Among the carbonates soluble in acid solution found suitable for use in combination with the sulfaminic acid are the alkali metal carbonates and bicarbonates, especially sodium bicarbonate. The alkaline earth carbonates, such as magnesium carbonate are also useful particularly when soap is not to be used simultaneously. If it is desirable to have a simultaneous cleaning and washing effect, when using alkaline earth carbonates, soap substitutes which are stable against alkaline earth carbonates may be used.

The products produced in accordance with this invention are non-hygroscopic in contrast to known similar compositions and therefore may be stored without the loss of the carbonic acid. This fact adds materially to their bubbling effect, as compared to that of known compositions when they are added to the treatment liquids. Furthermore, the sulfaminic acid forms water-soluble salts with the alkaline compounds of hard water and, therefore, the compositions of this invention do not form undesirable precipitates during use in such water.

The preparations made in accordance with this invention are suitable for a wide variety of uses, such as, for instance in the preparation of medicinal baths, foot baths, health and reducing baths, and in the preparation of bandages which are to develop carbon dioxide when in use. They may also be employed in fire extinguishers. In fact these effervescent tablets, powders and the like may be used wherever surging, bubbling and foaming effects are to be produced. They may even be used in beverages, but they are not totally acceptable in this connection because they impart a somewhat unpleasant taste.

Various types of the customary addition products may be incorporated with the compositions of the present invention, their incorporation and selection depending solely upon the use to which the compositions are to be put. For instance, compounds may be added to provide a pleasant odor, including various coniferous compositions, salts, ether oils, essences or the like. Furthermore, a variety of other salts may be incorporated including, such salts as sodium chloride, alkaline phosphates, such as alkaline pyro- and meta-phosphates, alkaline perborates and other mild cleansing agents. Suitable fillers and carriers, especially carriers for perfumes or scenting agents, also may be added including colloidal kaolin, starch, dextrine, gelatin, colloids, albumin, sugar, talc and similar known carriers. Substances assisting in producing therapeutic and cosmetic effects, likewise, may be added including such substances as camomile extracts, tar, colloidal sulfur, iron salts, borotartrates, tannates, lecithin and the like. Furthermore, saponaceous cleansing agents, as soaps and soap substitutes may be added to these compositions to give a wetting and emulsifying effect, including such compounds as, the fatty alcohol sulfonates, taurine substituted by higher molecular fatty acid groups, the sodium salt of cholic acid, saponine and the like. Finally, where coloring effects are desired, dyes may be added. In general, it may be stated that all addition agents heretofore found suitable for addition to such compositions as those disclosed herein for their improvement may be incorporated in the compositions of the present invention.

The following examples in which the parts appear in parts by weight are included as illustrative of the compositions of the present invention and are not to be considered in any way as limitations upon the scope of the invention.

Example 1

Ninety-two parts of sodium bicarbonate are thoroughly mixed with 87.8 parts of solid sulfaminic acid and with 22 parts of sulfated fatty alcohols derived from cocoanut oil. Then the mixture is perfumed with an extract producing a pine needle scent and compressed into tablets. The resulting product may be used when bathing and gives off carbonic acid gas when it is dissolved in the water of the bath.

Example 2

Tablets producing bubbles in bath water are prepared from dry mixtures of 630 parts of sodium bicarbonate, 630 parts of sulfaminic acid, 137 parts of swelling starch and 20 to 25 parts of pin needle oil. If color is desired, the mixture may be supplemented by an addition of uranin or the like before the composition is pressed into the tablet form.

In an alternative embodiment about 40 parts of the sodium salt of cellulose ether carboxyl acids may be used in place of the swelling starch.

Example 3

A composition especially suitable for use in the preparation of foot baths is obtained by mixing 80 parts of sodium bicarbonate, 75 parts of sulfaminic acid and 60 parts of sodium chloride, all in dry form.

Example 4

One hundred kilograms of finely pulverized sulfaminic acid are intimately mixed with 100 kgs. of finely pulverized sodium bicarbonate and then inserted into small cloth bags. These bags containing the aforesaid mixture are for use in fire extinguishers. Large amounts of carbonic acid gas are developed when the fire extinguishers are employed for putting out fires, the bags coming in contact with the water in the container. Ample pressure is produced within the container by the liberated gas to force the liquid therein onto the flame to be extinguished.

It should be understood that the present invention is not limited to the specific materials, compositions and processes herein described but that it extends to all equivalents which one skilled in the art would consider within the general purport of the instant disclosure and as within the scope of the appended claims.

I claim:

1. A stable composition in the form of crystals, powders, cakes and other solid forms suitable for use in cosmetic, therapeutic, fire extinguisher and other compositions requiring the presence of effervescent mixtures comprising a carbonate soluble in acid solution and as an acid ingredient sulfaminic acid.

2. A stable non-hygroscopic composition in a solid form adapted to produce carbon dioxide upon the addition of water consisting of an alkaline carbonate and sulfaminic acid.

3. A composition stable against deterioration in storage in the forms of cakes, tablets, powders, and other solid forms and adapted to produce carbonic acid gas upon the addition of water comprising sodium bicarbonate and sulfaminic acid.

4. A stable cosmetic composition of matter delivering carbonic acid gas upon the addition of water comprising a carbonate, sulfaminic acid, and a cleansing agent.

5. A stable composition in powdered form for use in fire extinguishers delivering carbonic acid gas, and generating pressure upon coming in contact with the water of said fire extinguisher, comprising sodium bicarbonate and sulfaminic acid.

BERNHARD RAECKE.

DISCLAIMER 2,228,483.—*Bernhard Raecke*, Dusseldorf-Schlageterstadt, Germany. PROCESS FOR THE PREPARATION OF PRODUCTS DELIVERING CARBONIC ACID GAS. Patent dated January 14, 1941. Disclaimer filed January 24, 1942, by the assignee, *The Procter & Gamble Company*.

Hereby enters this disclaimer to claims 1, 2, 3, and 5 respectively, in said specification.

[*Official Gazette February 17, 1942.*]

DISCLAIMER 2,228,483.—*Bernhard Raecke*, Dusseldorf-Schlageterstadt, Germany. PROCESS FOR THE PREPARATION OF PRODUCTS DELIVERING CARBONIC ACID GAS. Patent dated January 14, 1941. Disclaimer filed January 24, 1942, by the assignee, *The Procter & Gamble Company.*

Hereby enters this disclaimer to claims 1, 2, 3, and 5 respectively, in said specification.

[*Official Gazette February 17, 1942.*]